(12) United States Patent
Mongstad

(10) Patent No.: US 12,738,880 B2
(45) Date of Patent: Sep. 15, 2026

(54) STACK OF SOLAR MODULES WITH BIFACIAL SOLAR PANELS AND METHOD FOR INSTALLATION

(71) Applicant: Over Easy Solar AS, Oslo (NO)

(72) Inventor: Trygve Mongstad, Oslo (NO)

(73) Assignee: Over Easy Solar AS, Oslo (NO)

( * ) Notice: Subject to any disclaimer, the term of this patent is extended or adjusted under 35 U.S.C. 154(b) by 0 days.

(21) Appl. No.: 18/550,258

(22) PCT Filed: Mar. 18, 2022

(86) PCT No.: PCT/NO2022/050069
§ 371 (c)(1),
(2) Date: Sep. 12, 2023

(87) PCT Pub. No.: WO2022/203515
PCT Pub. Date: Sep. 29, 2022

(65) Prior Publication Data

US 2024/0313693 A1 Sep. 19, 2024

(30) Foreign Application Priority Data

Mar. 24, 2021 (NO) .................................... 20210379
Oct. 5, 2021 (NO) .................................... 20211187

(51) Int. Cl.
*H02S 20/20* (2014.01)

(52) U.S. Cl.
CPC .................................... *H02S 20/20* (2014.12)

(58) Field of Classification Search
None
See application file for complete search history.

(56) References Cited

U.S. PATENT DOCUMENTS 5,538,653 A 7/1996 Finkl
2003/0070368 A1* 4/2003 Shingleton .............. F24S 25/33 52/173.3
2010/0038507 A1 2/2010 Schwarze et al.
(Continued)

FOREIGN PATENT DOCUMENTS

AT 513296 3/2014
CN 111147005 A * 5/2020 ............. B32B 27/08
(Continued)

OTHER PUBLICATIONS

International Search Report and the Written Opinion for PCT/NO2022/050069, dated Jul. 19, 2022.
(Continued)

*Primary Examiner* — Dustin Q Dam
(74) *Attorney, Agent, or Firm* — Andrus Intellectual Property Law, LLP

(57) ABSTRACT

A stack including a plurality of solar modules on top of each other, the solar modules including a plurality of bifacial solar panels and first and second horizontal profile members arranged in parallel and wherein the plurality of bifacial solar panels are arranged substantially vertically with a horizontal distance therebetween in a length direction of the horizontal profile members and wherein the solar panels are connected to the first and second horizontal profile members. There is also disclosed a method for installing solar modules from such a stack.

20 Claims, 12 Drawing Sheets

(56) References Cited

U.S. PATENT DOCUMENTS

| | | | | |
|---|---|---|---|---|
| 2010/0212722 | A1* | 8/2010 | Wares | H01L 31/02 136/251 |
| 2011/0233157 | A1* | 9/2011 | Kmita | H02S 20/24 211/41.1 |
| 2015/0326175 | A1 | 11/2015 | Austin | |

FOREIGN PATENT DOCUMENTS

| | | | |
|---|---|---|---|
| CN | 213072545 U | * | 4/2021 |
| DE | 102009051766 | | 4/2011 |
| DE | 102010048730 | | 12/2011 |
| DE | 202014105516 | | 12/2014 |
| FR | 3054077 | | 1/2018 |
| WO | 2017118998 | | 7/2017 |
| WO | 2020070603 | | 4/2020 |
| WO | 2020213613 | | 10/2020 |

OTHER PUBLICATIONS

Response to the Written Opinion for PCT/NO2022/050069, dated Jan. 23, 2023.

International Preliminary Report on Patentability for for PCT/NO2022/050069, dated Mar. 7, 2023.

Search Report issued in Corresponding Norwegian Patent Application No. 20210379, dated Oct. 22, 2021.

Search Report issued in Corresponding Norwegian Patent Application No. 20211187, dated May 3, 2022.

* cited by examiner

STACK OF SOLAR MODULES WITH BIFACIAL SOLAR PANELS AND METHOD FOR INSTALLATION

CROSS-REFERENCE TO RELATED APPLICATIONS

This application is the U.S. national stage application of International Application PCT/NO2022/050069, filed Mar. 18, 2022, which international application was published on Sep. 29, 2022, as International Publication WO 2022/203515 in the English language. The International Application claims priority of Norwegian patents application Ser. Nos. 20/210,379, filed Mar. 24, 2021 and 20211187, filed Oct. 5, 2021. The international application and Norwegian applications are all incorporated herein by reference, in entirety.

FIELD

The present invention relates to a solar module with bifacial solar panels. More specifically the invention relates to a solar module including a plurality of bifacial solar panels, each solar panel including a plurality of bifacial photovoltaic elements. The invention also relates to a method for installing the solar module.

BACKGROUND

Solar panels for roof top installations have usually been installed substantially in the plane of the roof or, for flat rooftops, obliquely in a scaffold for optimized power generation and self-cleaning by rainfall. The solar panels are adapted to receive incoming light on one side and to convert the solar irradiance to power, often via a DC-AC inverter. A drawback with horizontal or partially horizontal installations is that the solar panels are prone to shading effects due to falling dust, sand, leaves, snow etc. Shading, even if only of one panel, can reduce the output of an entire solar module system. Another drawback of solar panels when used in conventional rooftop modules, is that they are exposed to significant wind forces that need to be taken into account when dimensioning and installing the modules and mounting systems. Even further, and partially because of the need to take wind forces into account, installation of such solar modules on rooftops has been complicated and time-consuming. At locations where snow loads have to be taken into consideration, the systems must also be designed to withstand these loads, often resulting in even more complex mounting and use of additional material in the mounting systems. At locations with much sand and dust, typically dry locations, solar panels need to be frequently cleaned to maintain power production at an acceptable level.

Lately, bifacial solar panels have gained larger market shares due to lower production cost with modern solar cell technology. It has been suggested to take advantage of the bifaciality of solar panels by placing them in flat rooftop installations, where the oblique angle of the panel permits light partly also to hit the solar panel from the back side. Some solutions have also been suggested where the solar panels have been installed vertically in a scaffolding, with a vertical gap between the rooftop and the solar panel to so that the panels can be used in combination with vegetation on the rooftop. The suggested solutions for vertical installation with panels above vegetation on the rooftop have the drawback that they are complicated to mount, as the structure is partly placed below the vegetation. The suggested solutions also have the drawback that their high mounting height above the surface gives high wind loads, disturbs the architecture of the building, and make the solutions, above all, less viable in cities where there are strict height limitations on buildings. A mounting height over the rooftop of 76 cm was e.g. suggested by Baumann et al., see "Solar Energy 190 (2019) p 139-146".

Installation work tasks for installing solar modules are today performed by workers doing manual operations such as mounting system placement, lifting of parts, assembly of mounting system, lifting and placement of solar panels, and fixation of the solar panels to the mounting structure and connecting the solar modules electrically to each other and to external connections. The nature of these tasks in today's solution makes them hard to automate, as there are many different operations requiring different skills and many different coarse and fine mechanical tasks. Also, the physical dimensions of today's solar modules make this difficult, especially concerning automation involving aerial vehicles, because of the bulky nature and large planar surface that may create disruption of air flow used to maneuver the aerial vehicle. The large, planar surface of today's modules also make them prone to high wind loads under lifting operations, making flight control and exact placement, even at low wind speeds, a challenging task.

WO 2020213613 A1 discloses solar installations intended for deserts and dusty areas. A plurality of solar panels is installed vertically with respect to the desert horizon.

US 2010/0038507 A1 discloses a mounting device for solar panels having a large aspect ratio, the solar panels being arranged in parallel on a flat surface.

DE 10 2009 051 766 B3 discloses a solar plant using longitudinal solar panels with reflector sheets in between.

US 2015/0326175 A1 discloses a system and method of producing electrical energy using an underlying reflective surface having emissive properties and one or more bifacial solar panels arranged such that a first face of the solar panel receives primarily direct sunlight, and a second face of the solar panel receives primarily indirect sunlight reflected from the underlying reflective surface.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect, the invention relates to a stack of solar modules on top of each other, each solar module comprising first and second horizontal profile members arranged in parallel and wherein the plurality of bifacial solar panels are arranged substantially vertically with a horizontal distance therebetween in a length direction of the horizontal profile members, wherein the solar panels are connected to and supported by the first and second horizontal profile members, and wherein the solar panels are connected to inner side portions of the horizontal profile members of the solar module.

The solar modules disclosed herein may also be referred to as a rack.

The solar panels may be connected to and supported on the horizontal profile members by means of brackets, in the form of profiles or clamps with screws, glued in place or pressed into a profile or clamp with friction rubber, or any combination of these.

It should be noted that herein "solar panel" is defined as a laminated or otherwise encapsuled solar unit including one or more photovoltaic elements connected in series. Typically, a solar panel will include one or more rows of solar cells connected in series included in a common encapsulation. In the case that the panel has two or more rows of cells, or a fraction of a cell, the series connected cell strings may be connected in parallel to each other within the panel, to mitigate mismatch losses from different light conditions at different heights above the mounting surface. The solar panel may or may not be surrounded by a frame. By "solar module" is meant two or more such panels connected and arranged as defined in the first aspect of the invention. The solar module/rack may be transported and lifted as a single unit. Two or more such solar modules, when installed in the vicinity of each other and electrically connected, will be defined as a "string" as will be explained below.

The solar modules are particularly suited for placement on a substantially flat surface. By "substantially" flat is meant that the surface may have a certain and natural unevenness or slope. E.g. a "flat" rooftop will also be made with a certain slope, usually in the order of 6° or less, to allow rain and melted snow to run off. The solar modules may also be intended to be placed on the ground, such as on a pergola over parking lots etc., in agrivoltaics, i.e. over agricultural areas, or ground mounted systems. Bifacial solar panels will in this invention be mounted substantially vertically to optimise solar irradiance on both sides of the panel. However, variations up to 10°, and in certain application even up to 25°, from vertical installation may be used while still taking advantage the bifaciality of the panels.

In one embodiment the photovoltaic elements may be bifacial silicon solar cells. As an alternative, the photovoltaic elements may be single-sided solar cells arranged back-to-back to obtain a bifacial panel.

Each panel may be around 2 to 5 centimetres higher than the "envelope" of the photovoltaic elements as glass or plastic and a potential surrounding frame adds in the order of 1-2 centimetres or more height on each side. In addition to the glass or plastic laminating the photovoltaic elements in place, the panel may or may not be provided with a surrounding frame. The frame, if present, may be made from aluminium or another light-weight metal, and may protect and add mechanical stability to the panels. The glasses themselves may give the necessary structural strength. The edge of the panel may be protected by a soft polymer or a stiff frame as to avoid damages during handling, mounting and operation.

In one embodiment, the height of each photovoltaic element may be defined by that of a single silicon wafer from which each of the bifacial silicon solar cells is made.

The cells of the solar panel may be of high bifaciality, preferably of the heterojunction technology (HJT) cell type or "Topcon", or any other high-efficiency solar cell technology with high bifaciality, i.e. the ratio of the nominal efficiency at the rear side, with respect to the nominal efficiency of the front side.

In one embodiment, the length of the solar panel may be in the order of 1 to 2 metres, preferably around 1.25 metres. In certain embodiments, depending on the size of each photovoltaic element, this may include 6-12 solar cells/photovoltaic elements of "standard" wafer size arranged in a row. As will be understood by a person skilled in the art, wafers for silicon solar cells are usually provided with a size of 150-210 mm in one dimension and 150-210 mm or cut in two or more equally sized pieces in the other dimension.

By "horizontal" and "vertical" should be understood that the profile members and the solar panels are substantially horizontal and vertical, respectively, when placed on an even and perfectly horizontal surface. In use, the surface on which the solar module is installed May be uneven and/or sloping, implying the length direction of the "horizontal" profile members may not be fully horizontal and that the solar panels, connected to the profile members, may not be fully vertically arranged.

The fact that the solar panels are connected to inner side portions of the horizontal profile members of the rack is very useful for enabling stacking such solar modules on top of each other for easy storage and transport.

In one embodiment, the solar module may be provided with an inverter connected to the first and second profile members. By "connected" is meant that the inverter may be mechanically connected to the horizontal profile members. In addition, the inverter will be electrically connected to the solar panels of the module, and optionally, also to adjacent solar modules. The inverter may replace one solar panel in the module and may be placed essentially at a position where a solar panel would also otherwise haven been positioned, whereby easy stacking of the solar modules may not be affected. Having an inverter pre-installed in a solar module that is already easy to install, may also reduce the work needed for an electrician to make the final electric installation on site. When several solar modules according to the invention are assembled in a string, it may be sufficient if one of the modules are provided with an inverter.

In one embodiment, the solar module may be provided with a battery or other energy storage unit connected to the first and second profile members. By "connected" is meant that the battery may be mechanically connected to the horizontal profile members. In addition, the battery, or other energy storage unit, may be electrically connected to the solar panels of the module, and optionally, also to adjacent solar modules. The battery may replace one solar panel in the module and may be placed essentially at a position where a solar panel would also otherwise haven been positioned, whereby easy stacking of the solar modules may not be affected. Having a battery pre-installed in a solar module that is already easy to install, may also reduce the work needed for an electrician to make the final electric installation on site. When several solar modules according to the invention are assembled in a string, it may be sufficient if one of the modules are provided with a battery (or another energy storage unit).

In one embodiment, each solar panel may be provided with one or more support members adapted to support the weight of the solar panel on a rooftop or another surface. Advantageously each solar panel may rest with its own weight on the roof top, or other surface, via the support members. The support members may be a pair of legs and/or brazing members provided at side portions of the solar module and being adapted to support each solar panel. Even though the horizontal profile members connect the solar panels into a module, it may be an advantage that each panel is separately supported on the mounting surface, such as a rooftop. This may reduce the load on the panels, dampen vibrations from wind and improve run-off of leaves, dust, snow etc. under the modules. For green roofs with low vegetation, the support members may also provide a sufficient distance between the solar panels and the roof surface to allow the vegetation to grow freely under the solar panels.

As such, in a position of use, the horizontal profile members, may be connected to the solar panels at a vertical distance above the mounting surface.

The support members will also allow the panels and the horizontal profile members to be suspended at a certain distance above the rooftop, the distance being in the range of 5-50 cm. This may be beneficial to allow for dirt and leaves to flow away from the installation. The distance may also permit combination with roofs covered in vegetation and may give increased energy production yield in the winter as snow will accumulate below the panels and not obstruct light hitting the modules.

The support members may be adapted to different kinds of surfaces to optimize for best friction and to reduce wear on the surface on which the module is mounted. As examples, for bitumen surfaces a rubber granulate mat may be used, and for green roofs a structured profile or sole for adhesion to the vegetation and underlying mats may be adopted.

The support members may or may not be connected via brackets to the horizontal profile members.

In one embodiment the horizontal profiles members may also be guides for cables and wires connecting the solar panels electrically to each other and/or to an external power output. This means that the profile may have the double-function of mechanically connecting and positioning the solar panels relative to each other, as well as to be a guide and protection for the necessary cables and wires. In one embodiment, the horizontal profile members may include a hinge allowing a first portion of the horizontal profile member to rotate relative to a second portion of the horizontal profile member around an axis substantially perpendicular to the length direction of the horizontal profile member. When the horizontal profile members on both sides of the solar panels have such a hinge, this may allow the module to better adapt to an uneven and/or sloping surface. A mentioned above, a "flat" roof may e.g. be sloping in the order of 6° or less, often around 4°. Such a substantially flat roof may also be provided with a ridge from which the roof slopes in opposition directions. The hinge may therefore allow the solar module to better fit to such a sloping roof, including if the module is placed at or near the ridge.

In one embodiment, as an addition or alterative to the hinged profile members, the support members of the module may be of adjustable length to better adapt to uneven and/sloping surfaces. In one embodiment an inner or outer portion of the support member may be telescopically arranged relative to the remainder of the support member, whereby its length may be adjusted relative to a neighbouring support member. It may be possible to lock the support member of adjustable length at different lengths whereby the support member may also be adapted to support the weight of the solar module when extended or shortened.

In one embodiment, the horizontal distance between each bifacial solar panel in the length direction of the profile members may in the order of the height of the solar panels, preferably from 0.8 to 3 times the height of the solar panels. A person skilled in the art will understand that the distance may be an optimization based on the height and orientation of the panels and the solar conditions at the location on which they are installed.

In one embodiment the solar module may include 2-6 bifacial solar panels, preferably 4 bifacial solar panels, though it should be emphasized that the module may also include more than 6 panels. The solar module arrangement, with the solar panels vertically connected between the horizontal profile members enable the combination of several solar panels into a readily assembled module, where the whole module may be installed as one unit, including by means of an unmanned surface or aerial vehicle as will be discussed briefly below.

In one embodiment the connection between a front and/or rear solar panel to the horizontal profile members may be reinforced compared to the connection of one or more intermediate solar panels to the horizontal profile members. The present applicant has surprisingly found, through modelling of wind loads on solar modules, strings and installations according to the invention, that the wind load on a first panel in a module, or row of panels in a string or installation, is significantly higher than on a second panel, or any other panel in the row, and the first and subsequent panels may even experience wind loads of opposite direction in a steady-state situation. It may therefore be sufficient if the connection of a first panel may be reinforced, which may reduce weight and cost of the solar modules. Reinforcement may e.g. be enabled by thicker and/or larger bracing members and/or by diagonal support members as discussed below.

In addition, or as an alternative, a front and/or rear solar panel in a row, string or installation may be lower than the other solar panels in the row, string or installation. Since the present applicant has found that the wind loads are significantly reduced after the first panel or row of panels, subsequent panels may be made higher while still maintaining the module or string within acceptable wind tolerances. The front or rear solar panel may also not be an active photovoltaic element if its task is only to create a wind breaker for the rest of the installation.

In order to increase energy yield where the mounting surface has low reflection or albedo, the module may include reflectors, substantially vertically mounted, with highly reflective materials or coatings mounted substantially midway between the solar panels along the horizontal profile members. The height of the reflectors will typically be half of the height of the solar panels.

There is also disclosed a string including a plurality of solar modules. The string includes plurality of solar modules connected in series via an external connector to provide an output voltage that may typically be in the range of 100 V to 1500 V, depending on the maximum power point tracker of the inverter, as will understood by a person skilled in the art.

There is also disclosed an installation including a plurality of such strings.

Solar modules in an installation including one or more strings of solar modules may also be mechanically connected to each other (otherwise than through the electrical connection), which may offer better resistance against wind loads. The mechanical connection may be enabled by connecting the horizontal profile member and/or support member and/or a solar panel in one solar module to that of an adjacent solar module. The mechanical connection may be done by connecting the parts directly to each other or via a bracket or similar. One or more modules may additionally, or as an alternative, be mechanically connected or ballasted to the surface, such as to the roof, on which it is placed. As mentioned above, lateral wind forces will be significantly higher on a first (row of) panel(s), and even of opposite direction from the other rows of panels. By connecting the modules mechanically to each other, the wind loads on the modules will be distributed through the installation. In addition, or as an alternative, the installation may be provided with a wind breaker positioned in front of the front and/or rear row of panels.

Junction boxes, including power electronics and bypass diodes, may be connected at one or both sides of the solar panels. The junction boxes are preferably provided at the lower parts of the panels (in a position of use). The junction boxes will preferably be placed on the edge of the panels, allowing for the panels to be connected without preparing holes in the glass. In one embodiment, if the solar panels are of a low type and include only one row of solar cells, each panel could be provided with two junctions boxes; one for each of the positive and negative sides. The current may, in one embodiment, be returned via a neighboring panel. The current may also be returned through an external conductor to the other junction box. In an embodiment where each panel is provided with a single junction box, the current from the row of cells/photovoltaic elements in each panel may be led back using a return ribbon laminated into the lower part of the panel. In another alternative, the current may be returned by splitting each photovoltaic element in two equal parts and letting either the lower or the upper part be the return string.

As explained herein, certain configurations of the solar modules allow for compact storage and transport while the modules are arranged in a stack. The stack may also provide a natural distance between panels of modules stacked on top of each other due to a small lateral offset between each module in the stack, similar to backrests in a stack of chairs. This may be beneficial for avoiding glass to glass contact during transport (if the panels are encapsuled by glass), thus solving a significant logistics problem in the industry.

The stack may be supported under transport by a pallet or specialised support that enables easy handling and lifting. The top of the stack may also be protected by a specialised support that allows another stack to be placed on top of the first under transport. The specialised top support may rest on the horizontal profile member of the topmost module in the stack and protect the topmost solar panels from mechanical impacts. When another stack or any other weight is placed on top of the specialised top support, the support may ensure that the weight is well supported without causing damage to the panels or modules in the lower stack.

In a second aspect, the invention relates to a method for installing a solar module from a stack according to the first aspect of the invention on a surface, the method including the steps of:

lifting the solar module as a whole; and placing the solar module onto the surface, such as on a rooftop.

The method may, prior to the step of lifting the solar module as a whole, include the step of lifting a stack of such solar modules a whole.

The method may, if the solar module does not already include an inverter, include the step of connecting the solar module to a solar power inverter.

The method may also include the additional step of connecting the solar module electrically to another solar module in series to define a string of solar modules. In addition, the method may also include connecting the solar module mechanically to another/adjacent solar module in the string or installation. Since, as explained above, the wind loads are significantly higher on the front row of panels, the solar modules in the string or installation may not need to be individually anchored or ballasted and may also be “free floating” without external mechanical connections to other solar modules.

In one embodiment, the method may be fully or partially implemented by means of an unmanned surface or aerial vehicle. To further reduce cost of installation of solar plants in the future, it may be beneficial to automate work tasks. The solar module includes both the mounting structure and the solar panels in the same device. Placement and installation of the panels will be more efficient than for today’s solutions. It also creates an opportunity for automating the installation work tasks, as fewer and more similar/repetitive operations may be needed, mainly lifting the modules and placing them in the right location. The automation may be performed by a worker, a surface vehicle, or an aerial vehicle.

BRIEF DESCRIPTION OF THE DRAWINGS

In the following are described examples of preferred embodiments illustrated in the accompanying drawings, wherein.

DETAILED DESCRIPTION OF THE DRAWINGS

Figure 1:
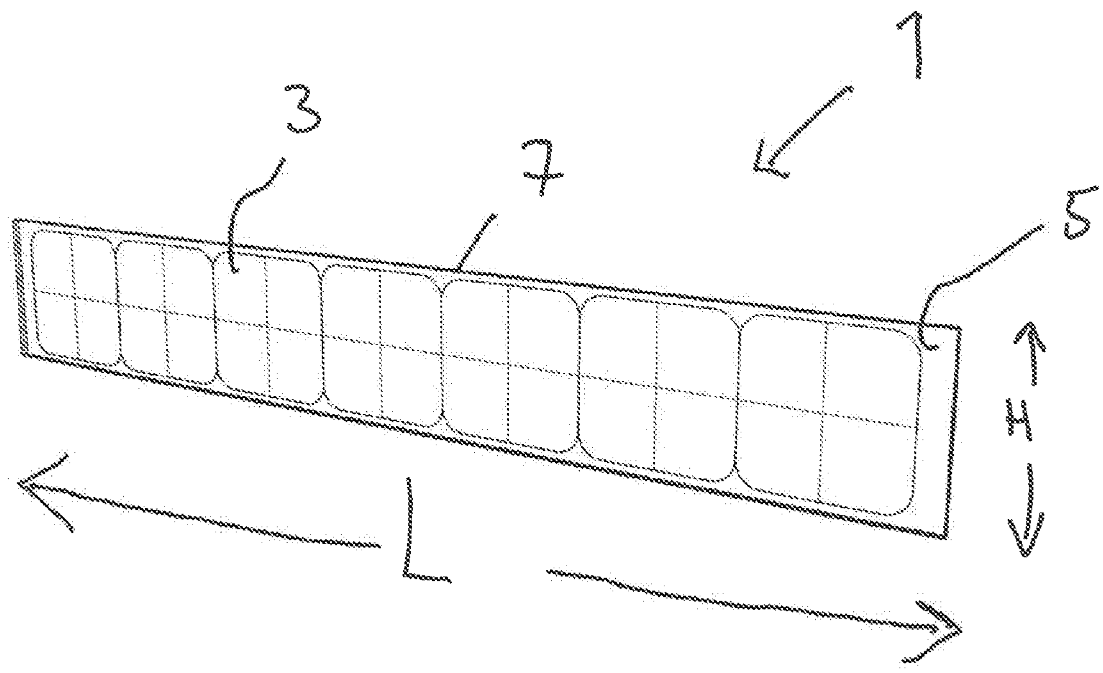
FIG. 1 shows an exemplary solar panel that may be used in a module.

In the following reference numeral 1 will be used to denote a solar panel, while reference numeral 10 will be used to denote a solar module. Reference numeral 100 will be used to denote a stack of such modules, while reference numeral 1000 is used to denote a solar installation comprising a plurality of solar modules 10. Identical reference numerals refer to identical or similar features in the drawings. The drawings are shown schematically and simplified, and various features therein are not necessarily drawn to scale.

FIG. 1 shows an exemplary solar panel 1 as may be included in a solar module 10 shown in the following figures. In the shown embodiment, the exemplary solar panel 1 includes seven bifacial silicon solar cells 3 arranged in a row of which only one of the sides is visible in the perspective view. The solar cells are electrically connected in series and laminated by glass plates 5 and surrounded by a thin frame 7. Internal and external electrical connections are not shown in the figure. The shown solar panel 1 has a length L of about 125 cm, while the height H is approximately 19 cm. The solar cells are squares with rounded corners and a length of approximately 17 cm, implying that lamination and frame adds about 1 cm height on each side and 3 cm on each side in the length direction.

Figure 2:
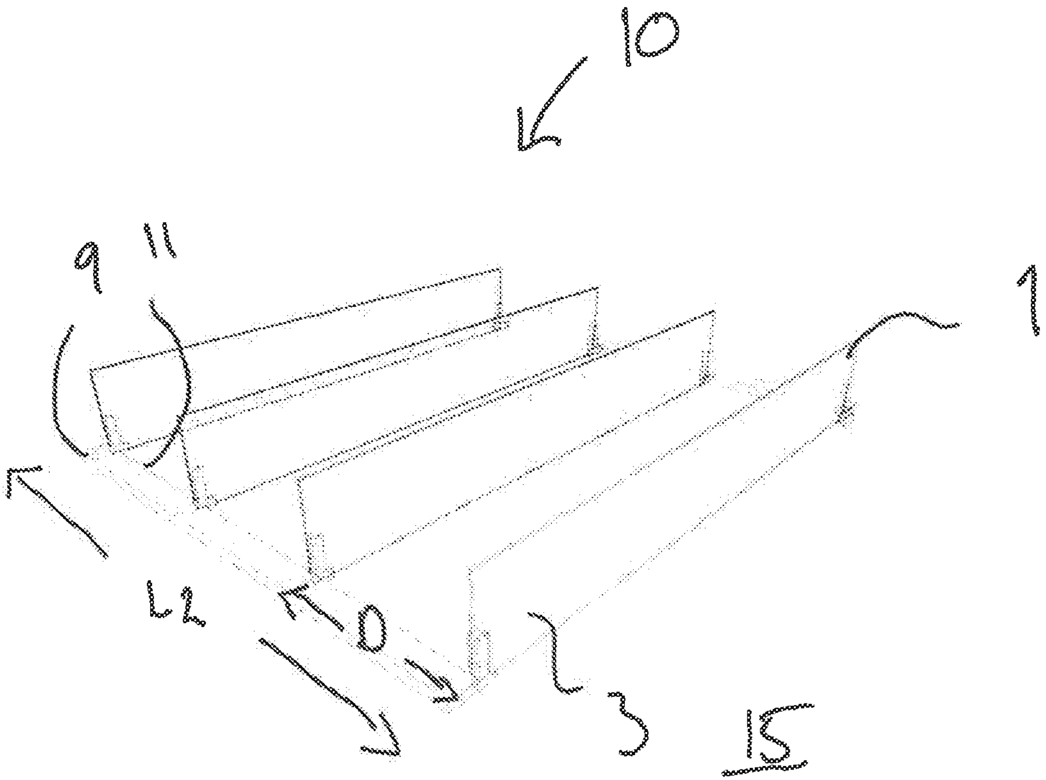
FIG. 2 shows a first embodiment of a solar module.

In FIG. 2 a first embodiment of a solar module 10 according to the present disclosure. The shown module includes four solar panels 1. The panels are connected to a horizontal profile member 9 on each side, and they are arranged substantially vertically and equidistantly along the horizontal profile members 9. In the shown embodiment, the length L2 of each horizontal profile member is 1.01 m, whereby the distance D between the solar panels along the horizontal profile members is approximately 33 cm. The panels 1 are connected to inner side portions 11 of the horizontal profile members 9. The short horizontal distance between the solar panels 1 is a consequence of the very low height of the solar panels 1 according to this first exemplary embodiment. In the shown embodiment, the horizontal profile members 9 are resting on a surface 15 on which the solar module 1 is placed. The mechanical arrangement supporting the solar module 10 of this embodiment is not limited to be used with the low solar panels 1 from FIG. 1 but could be used with any type of bifacial solar panels.

Figure 3:
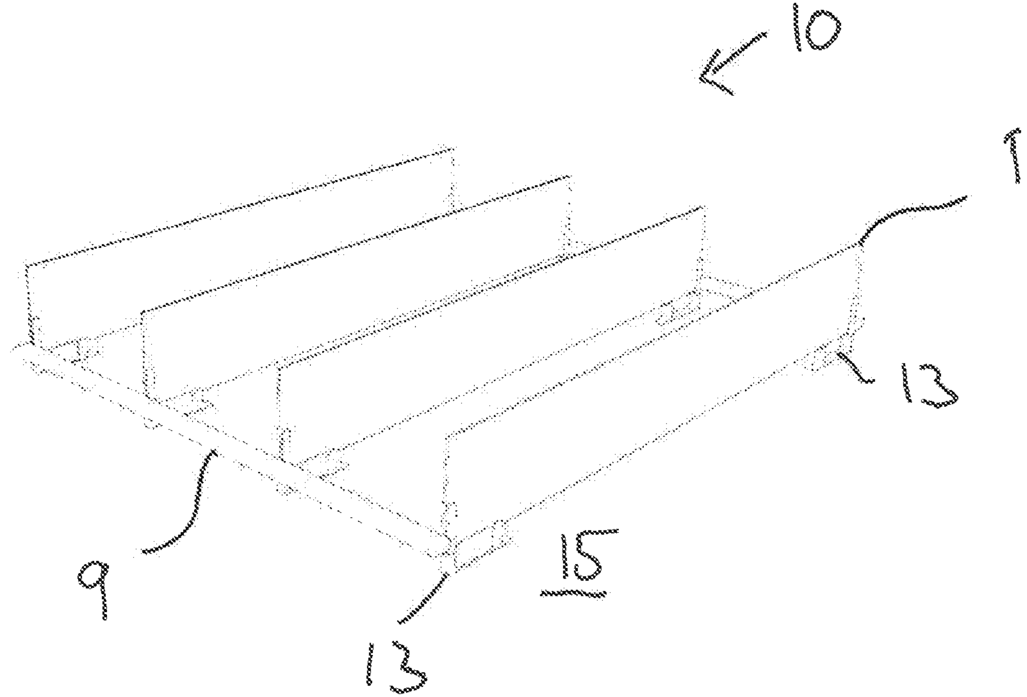
FIG. 3 shows a second embodiment of solar module.
Figure 8:
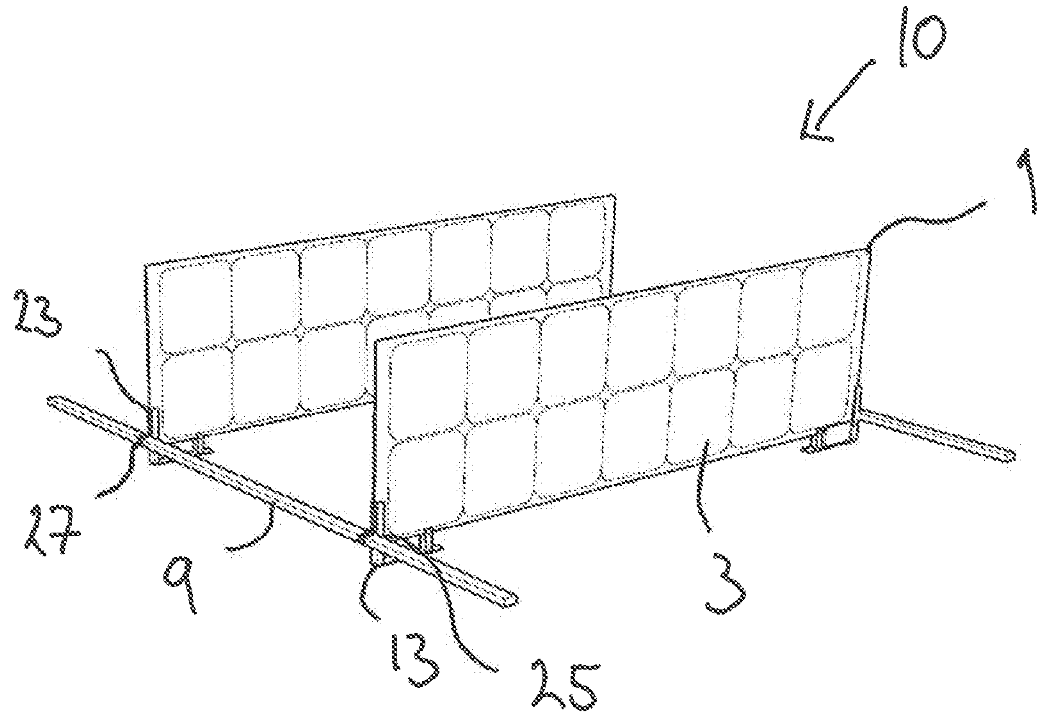
FIG. 8 shows a fourth embodiment of a solar module.
Figure 9:
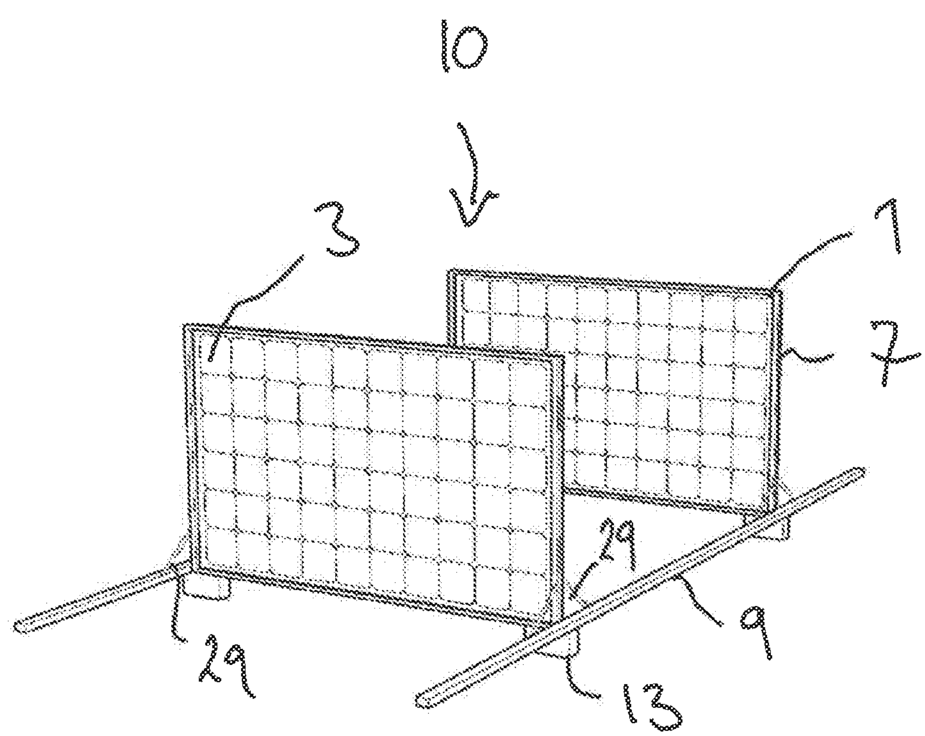
FIG. 9 shows a fifth embodiment of a solar module.

FIG. 3 shows a second embodiment of solar module 10 according to the invention. Each solar panel 1 is provided with support members, here in the form of a pair of legs 13, supporting the weight of the solar module 10 on the surface 15, while the horizontal profile members 9 are positioned a vertical distance above the surface 15. In this embodiment, the role of the profile members 9 is to connect the solar panels 1 mechanically together and to keep them in a correct position and orientation relative to each other, while at the same time functioning as a cable tray for not shown electrical connections between the solar panels and/or between adjacent solar modules 10. Also here, it should be noted that the shown mechanical arrangement supporting the solar module 10 on the surface 15 is not limited for use with the low panels shown in FIGS. 1 and 2 but could be used with any type of bifacial solar panel 10, including with two or more rows of solar cells as shown in FIGS. 8 and 9 and discussed below.

Figure 4:
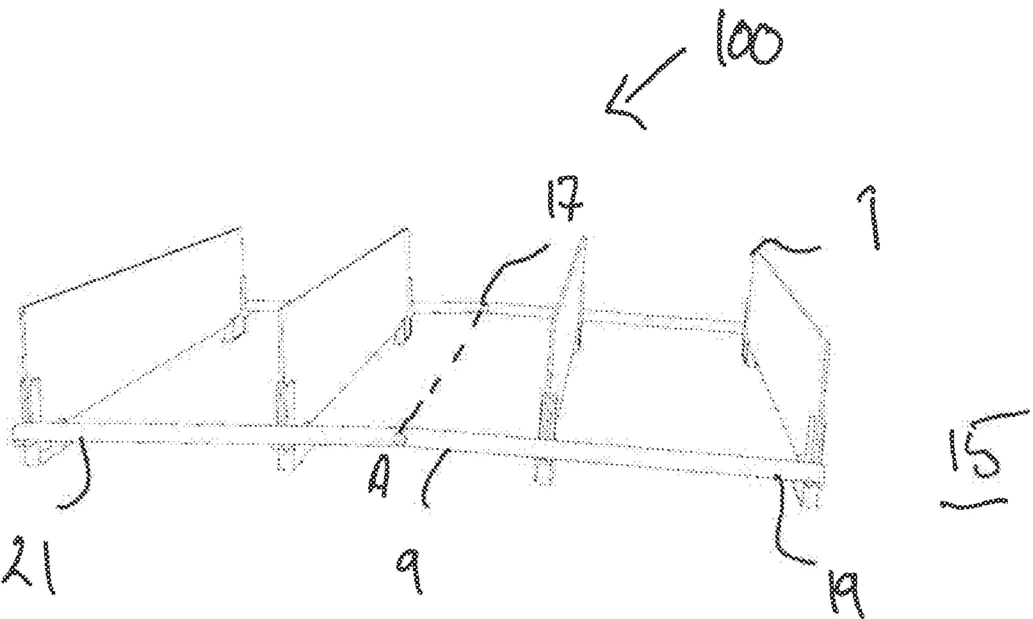
FIG. 4 shows a third embodiment of a solar module.

FIG. 4 shows a third embodiment of a solar module 10 according to the invention. The solar module resembles the one from the second embodiment as shown in FIG. 3 but with the difference that each horizontal profile member 9 is provided with a hinge 17, substantially in the middle in the length direction, allowing a first portion 19 of the horizontal profile member 9 to rotate relative to a second portion 21 of the horizontal profile member 9 around an axis A substantially perpendicular to the length direction of the horizontal profile member 9. This allows the whole solar module 10 to rotate so that the two solar panels 1 connected to the first portion 19 of the horizontal profile members 9 may rotate relative to the two solar panels 1 that are connected to the second portion 21 of the horizontal profile members 9. This may be particularly useful if the solar module 10 is to be placed on a sloped or uneven surface, such as over a ridge on a substantially flat rooftop. The horizontal profile members 9 may be provided with additional, not shown, hinges for increased flexibility. The hinged solution of the third solar module embodiment may also be used with bifacial solar panels 1 of any dimension.

Figure 5:
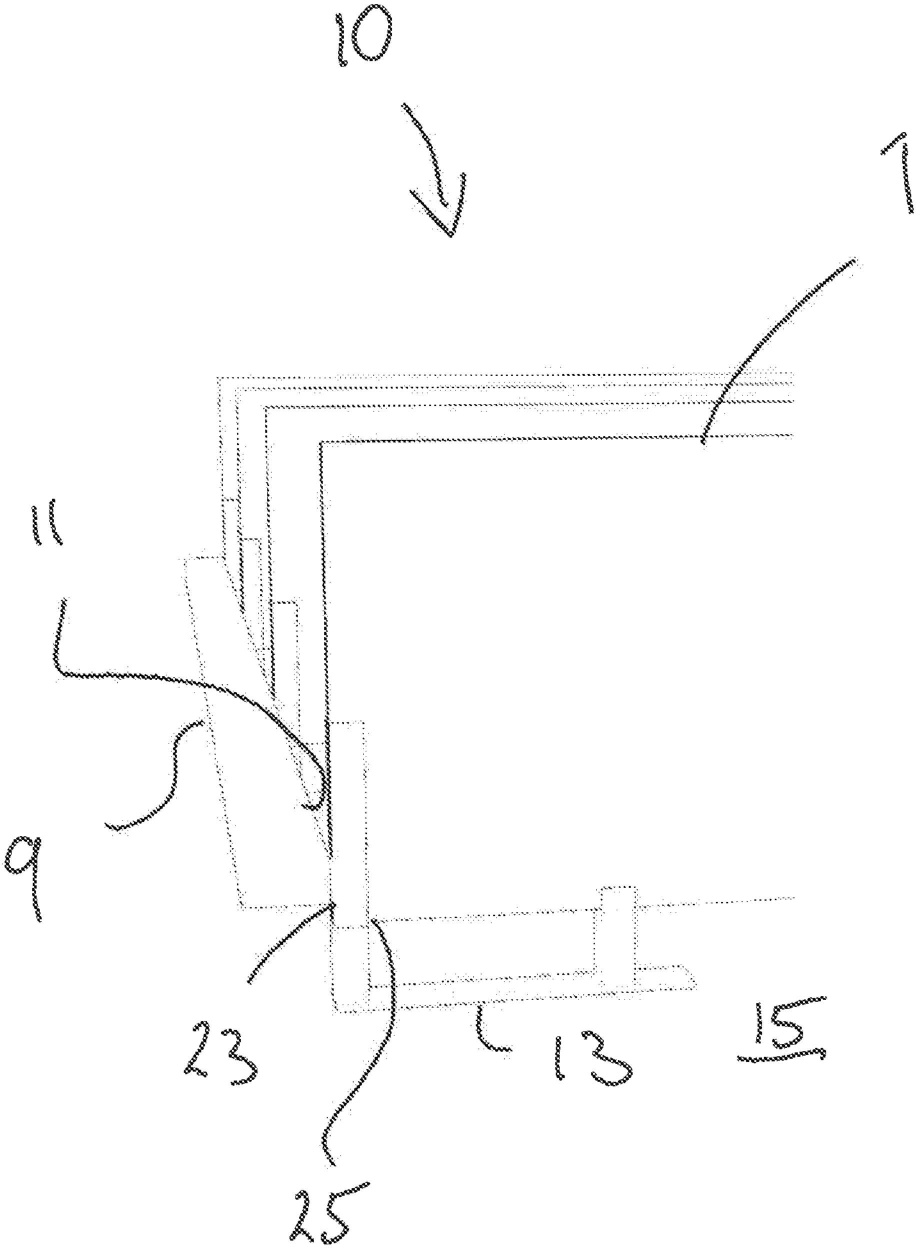
FIG. 5 shows an enlarged detail of the solar module from FIG. 3.
Figure 6:
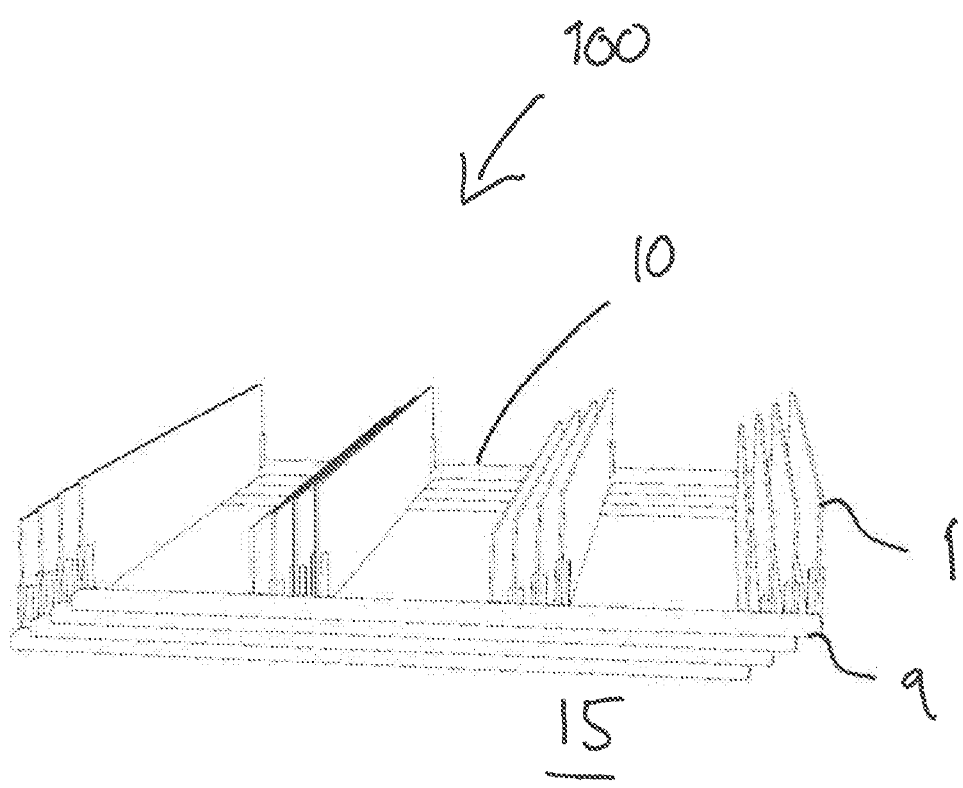
FIG. 6 shows a first exemplary stack of solar modules according to the invention.

FIG. 5 shows an enlarged detail of the embodiment from FIG. 3. It can be seen how the solar panels 1 are connected to the inner side portion 11 of the horizontal profile member 9, while the solar panels 1 as such are supported by the legs 13. The horizontal profile member 9 is, in the shown embodiment, welded or otherwise connected to a reinforced brazing portion 23 in a lower corner 25 of each of the solar panels 1 and extending about ⅓ of the height of the solar panel 1. The reinforced brazing portion 23 also forms the connection to the legs 13, whereby the laminated glass and the solar cells 3 as such are protected. The configuration where the horizontal profile members 9 are arranged on the sides of the solar panels 1 allows the solar modules 10 to be arranged in a stack 100, as shown in FIG. 6, which significantly simplifies storage and transport of the solar modules 10. With a small lateral offset between the solar modules 10 stacked on top of each other, direct contact between the solar panels 1 is avoided, whereby glass-glass contact may be avoided during storage and transport.

Figure 7:
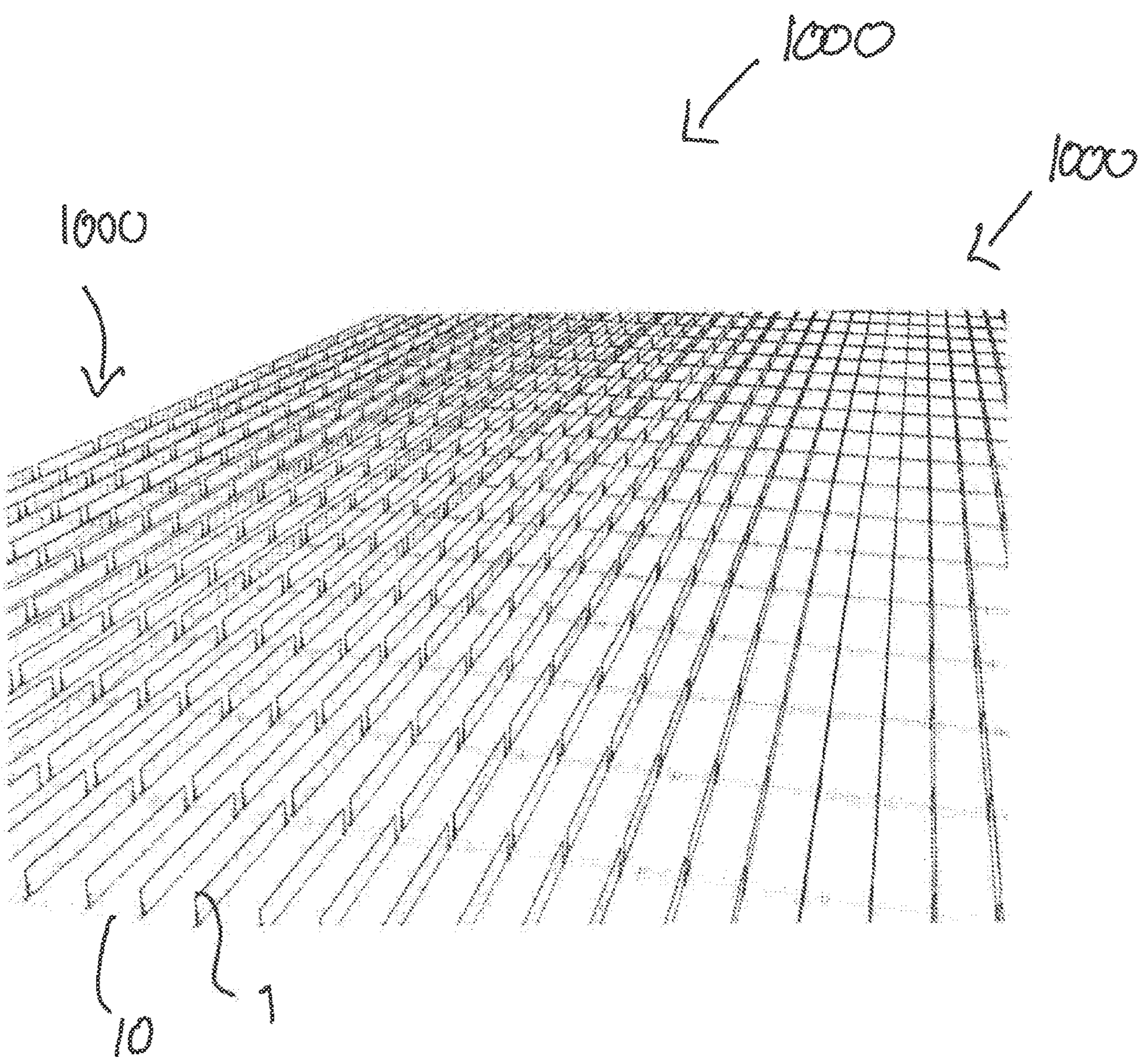
FIG. 7 shows a first exemplary string of solar modules.

FIG. 7 shows a plurality of solar modules 10. The modules are electrically connected to define strings of solar modules 10 in an installation 1000 as described herein. Internal and external electrical connections are not shown in the figure. The modules may also be mechanically connected to each other to make the installation more robust against wind lift forces.

FIG. 8 shows a fourth embodiment of a solar module 10 according to the invention. The solar module 10 includes two solar panels 1, each solar panel 1 including two rows of seven solar cells 3 each. The horizontal profile members 9 are in a slightly thinner version than the ones shown in the previous figures. In the shown embodiment, the horizontal profile members 9 are clamped to the reinforced brazing portions 23 in the lower corners 25 of the solar panels by means of clamping members 27.

FIG. 9 shows a fifth embodiment of a solar module 10 according to the invention. The solar module 10 includes two solar panels 1, each solar panel 1 including six rows of ten solar cells 3 each. The horizontal profile members 9 are of a similar design as in FIG. 8 and are supported on legs 13 that are of a slightly more solid construction than the legs of FIG. 8. Each solar panel 1 is connected to the horizontal profile members 9 by two pairs of diagonal support members 29 connected to the frame 7 of each panel 1 and to the horizontal profile members 9. The frame 7 is, because of the increased size of the solar panel 1, thicker and more robust than in the other embodiments. The diagonal support members 29 stabilize the solar panels 1 on the horizontal profile members 1 and are adapted to take up both strain and compression. In the shown embodiment, the diagonal support members form angles of about 45° with the horizontal profile members 9.

Figure 10:
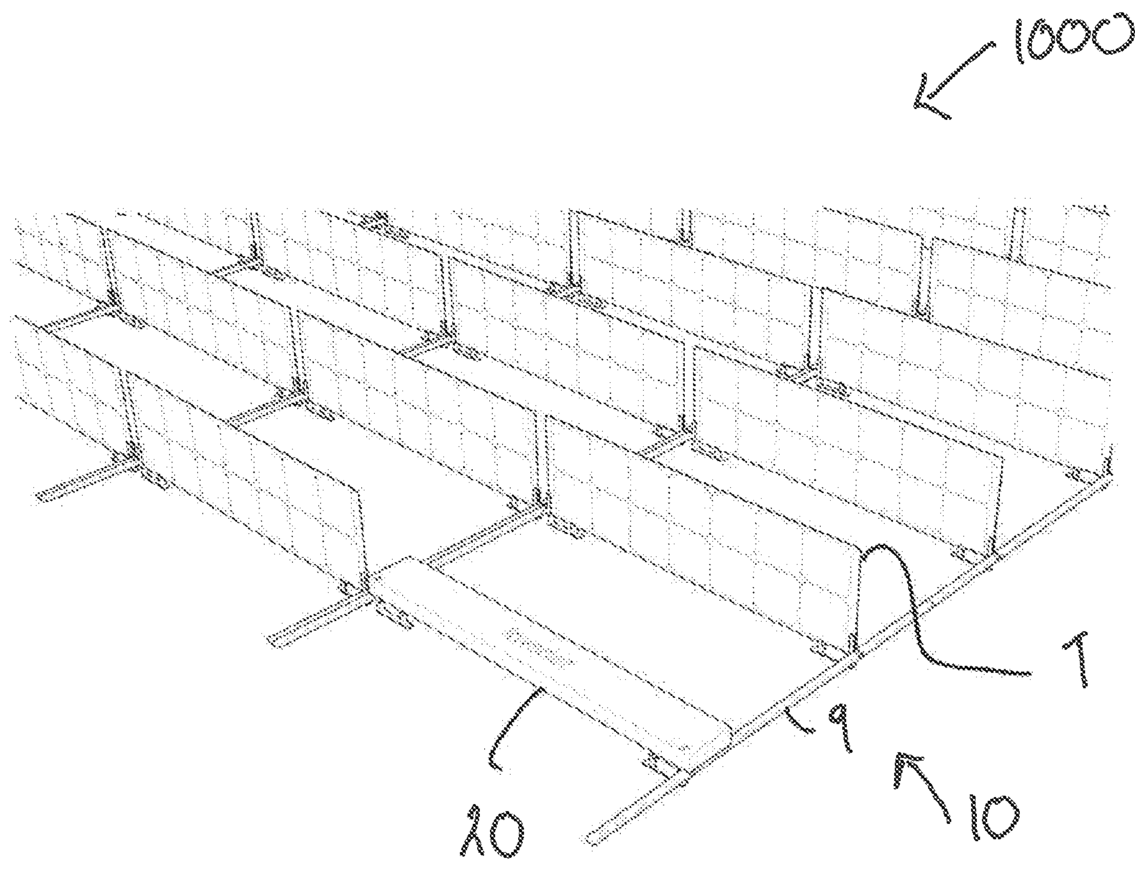
FIG. 10 shows a second exemplary string of solar modules.

FIG. 10 shows a part of a solar installation 1000 according to the invention, where an inverter 20 is included in one of the shown solar modules 10. Having an inverter pre-installed in one of the modules 10, simplifies installation and may enable house- and landowners to install the modules and the inverter in place without professional help from an electrician.

Figure 11:
FIG. 11 shows a second exemplary stack of solar modules according to the invention.
Figure 11:
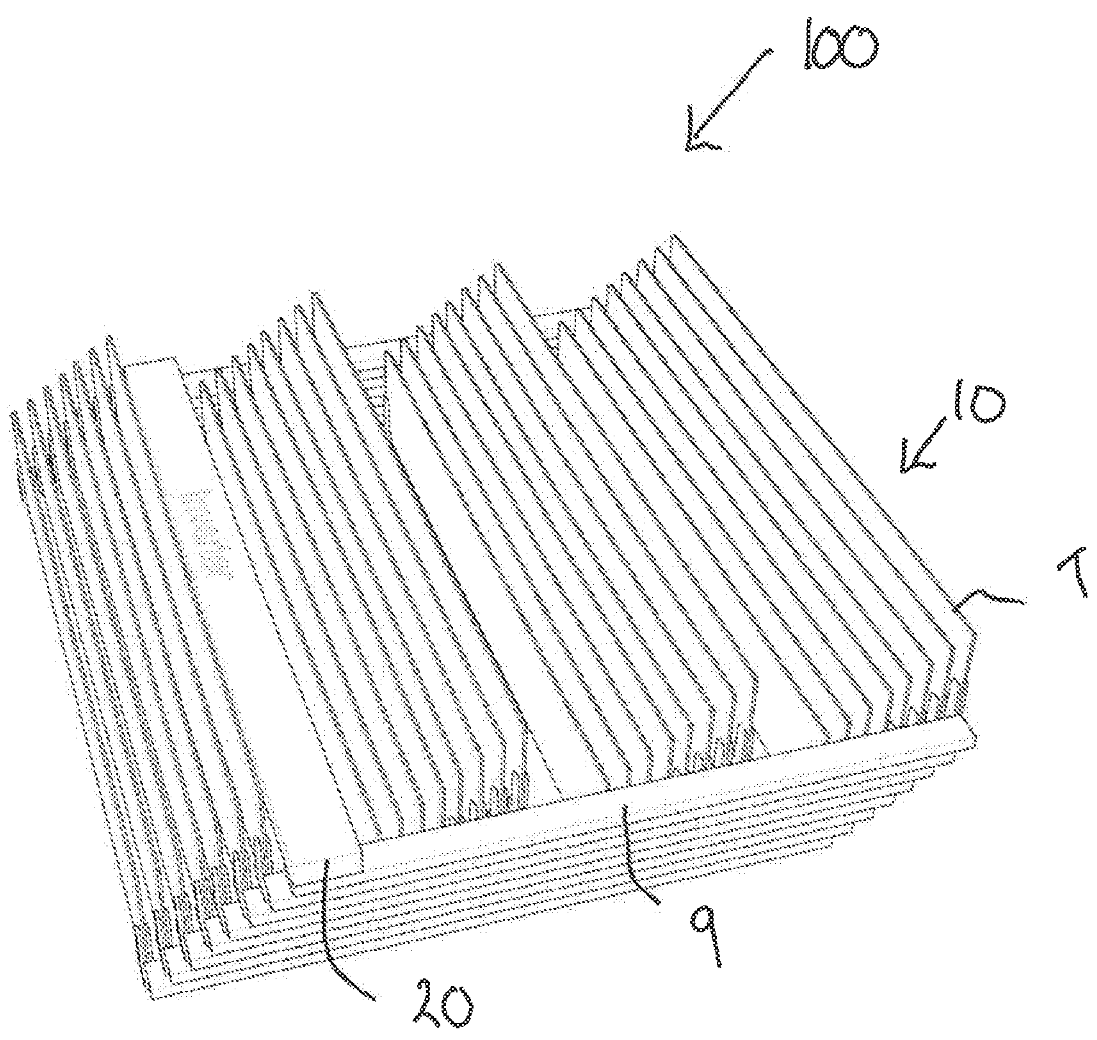

FIG. 11 shows a stack 100 of solar modules 10, where the uppermost solar module 10 of the stack includes an inverter 20 as explained above.

Figure 12:
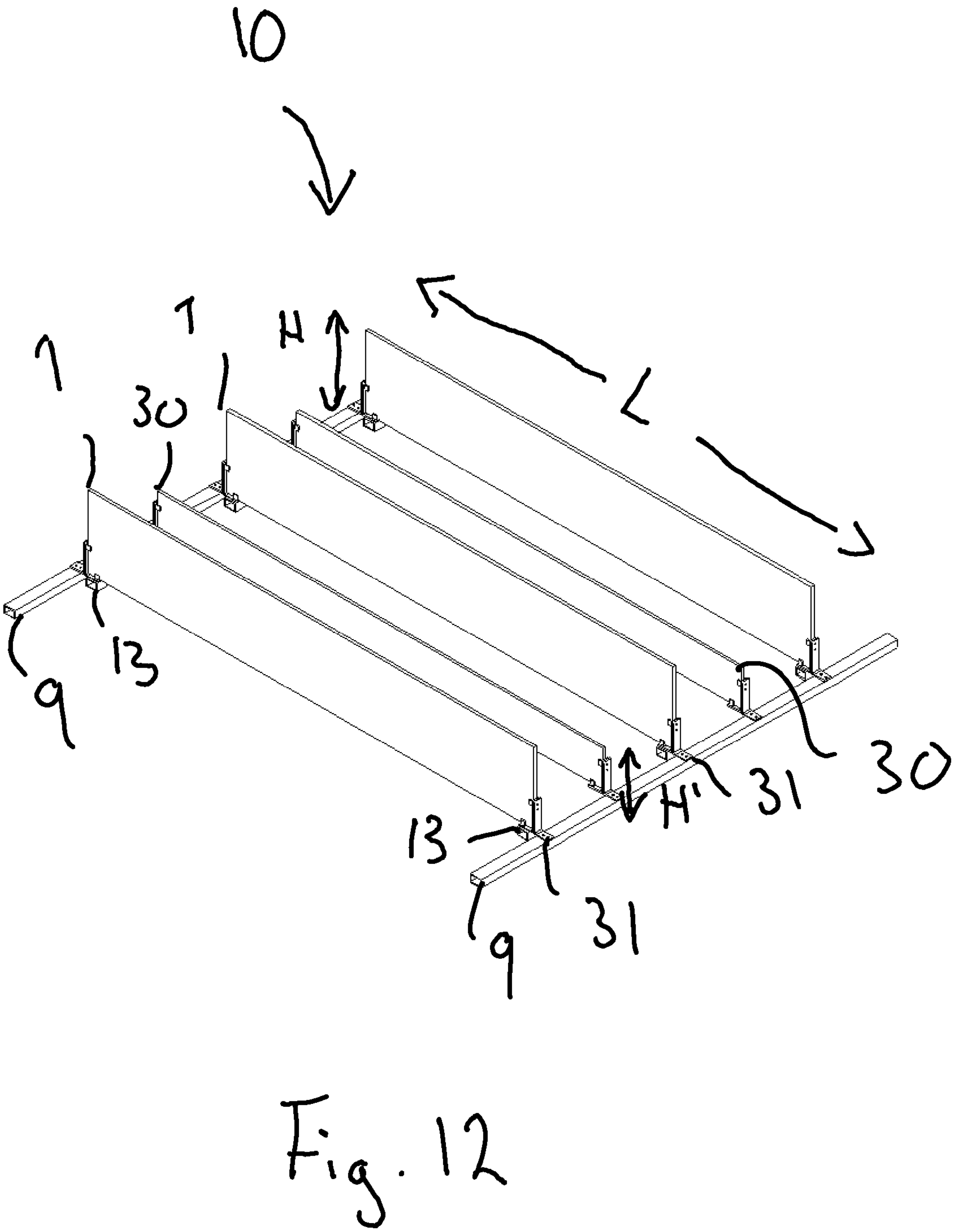
FIG. 12 shows a sixth embodiment of a solar module.

FIG. 12 shows a sixth embodiment of a solar module 10 according to the invention. In the shown embodiment, the solar module 10 is provided with reflectors 30 positioned substantially midway between the solar panels 1 along the horizontal profile members 9. Similarly to the solar panels 1, the solar reflectors 30 are connected to one horizontal profile member 9 on each side on the inside of the horizontal profile members 9 substantially vertically and equidistantly along the horizontal profile members 9. In the shown embodiment, the reflectors 30 have the same length L as the solar panels, while their height H' is substantially half of the height H of the solar panels 1. In the shown embodiment, both the solar panels 1 and the solar reflectors 30 are connected to the horizontal profile members 30 by means of (upside-down) T-shaped brackets 31. The solar panels 1 are additionally supported by legs 13 on the ground/roof top as explained above, implying that the reflectors, in the shown embodiment are only support by the horizontal profile members 9. In an alternative embodiment, also the solar reflectors 30 may be supported directly on the ground.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An easily transported stack of solar modules comprising:

a plurality of pre-assembled solar modules on top of each other, wherein each pre-assembled solar module comprises:

a plurality of bifacial solar panels;

first and second horizontal profile members arranged in parallel, the plurality of bifacial solar panels being arranged substantially vertically with a horizontal distance therebetween in a length direction of the first and second horizontal profile members, wherein the plurality of bifacial solar panels are connected to the first and second horizontal profile members, and wherein the plurality of bifacial solar panels are connected to inner side portions of the first and second horizontal profile members, and wherein the first and second horizontal profile members are also guides for cables and wires connecting the plurality of bifacial solar panels to each other and/or to an external power output; and at least one wire disposed within at least one of the horizontal profile members for electrically connecting at least a pair of the plurality of bifacial solar panels to each other and/or for electrically connecting at least one of the plurality of bifacial solar panels to an external power output.

2. The stack according to claim 1, wherein each solar panel is provided with one or more support members adapted to support the weight of the solar panel.

3. The stack according to claim 2, wherein one or more support members is/are of adjustable length.

4. The stack according to claim 1, wherein at least one of the plurality of pre-assembled solar modules comprises a substantially vertical reflector connected to the first and second horizontal profile members midway between a pair of bifacial solar panels of the plurality of bifacial solar panels, such that a vertical axis of the substantially vertical reflector is substantially perpendicular to a horizontal axis of the first and second horizontal profile members where the substantially vertical reflector intersects the first and second horizontal profile members.

5. The stack according to claim 1, wherein at least one of the plurality of pre-assembled solar modules comprises an inverter connected to, and supported by, the first and second horizontal profile members.

6. The stack according to claim 1, wherein at least one of the plurality of pre-assembled solar modules comprises a battery or other energy storage unit connected to the first and second horizontal profile members.

7. The stack according to claim 1, wherein the plurality of bifacial solar panels of each pre-assembled solar module comprises 2-7 bifacial solar panels.

8. The stack according to claim 1, wherein the at least one wire forms an electrical connection between a first bifacial solar panel and a second bifacial solar panel of the plurality of bifacial solar panels.

9. The stack according to claim 1, wherein the first and second horizontal profile members, in a position of use, are connected to the plurality of bifacial solar panels at a vertical distance above a surface on which the respective pre-assembled solar module is placed.

10. The stack according to claim 9, wherein the vertical distance of the plurality of bifacial solar panels above the surface is in the range 5-50 cm.

11. The stack according to claim 1, wherein the plurality of pre-assembled solar modules comprises a first plurality of pre-assembled solar modules and a second plurality of pre-assembled solar modules, the stack further comprising a bottom and/or top support to be used during transport between the first plurality of pre-assembled solar modules and the second plurality of pre-assembled solar modules to prevent mechanical impacts between an upper pre-assembled solar module of the first plurality of pre-assembled solar modules and a lower pre-assembled solar module of the second plurality of pre-assembled solar modules, or to prevent mechanical impacts between a lower pre-assembled solar module of the first plurality of pre-assembled solar modules and an upper pre-assembled solar module of the second plurality of pre-assembled solar modules.

12. A method for installing a pre-assembled solar module from an easily transported stack of solar modules on a surface, wherein the easily transported stack comprises a plurality of pre-assembled solar modules on top of each other, wherein each of the plurality of pre-assembled solar module comprises:

a plurality of bifacial solar panels; and first and second horizontal profile members arranged in parallel, the plurality of bifacial solar panels being arranged substantially vertically with a horizontal distance therebetween in a length direction of the first and second horizontal profile members, wherein the plurality of bifacial solar panels are connected to the first and second horizontal profile members, and wherein the plurality of bifacial solar panels are connected to inner side portions of the first and second horizontal profile members, and wherein the first and second horizontal profile members are also guides for cables and wires connecting the plurality of bifacial solar panels to each other and/or to an external power output; and at least one wire disposed within at least one of the horizontal profile members;

wherein the method further comprises the steps of:

lifting the pre-assembled solar module, as one unit, from the stack; and placing the pre-assembled solar module on the surface.

13. The method according to claim 12, where method, prior to the step of lifting the pre-assembled solar module as a whole, comprises the step of lifting a stack of such modules as a whole.

14. The method according to claim 12, wherein the method further comprises the steps of:

lifting a second pre-assembled solar module of the plurality of pre-assembled solar modules, as one unit, from the stack, wherein the second pre-assembled solar module supported the pre-assembled solar module prior to the pre-assembled solar module being lifted from the stack;

placing the second pre-assembled solar module on the surface and adjacent to the pre-assembled solar module; and connecting the second pre-assembled solar module mechanically to the pre-assembled solar module.

15. The method according to claim 14, wherein connecting the second pre-assembled solar module mechanically to the pre-assembled solar module comprises mechanically connecting the first horizontal profile member of the pre-assembled solar module to the second horizontal profile member of the second pre-assembled solar module.

16. The method according to claim 15, wherein connecting the first horizontal profile member of pre-assembled solar module to the second horizontal profile member of the second pre-assembled solar module comprises mechanically connecting the first horizontal profile member of pre-assembled solar module to the second horizontal profile member of the second pre-assembled solar module via a bracket.

17. The method according to claim 12, wherein the method further comprises the step of connecting the pre-assembled solar module electrically to another pre-assembled solar module.

18. The method according to claim 17, wherein connecting the pre-assembled solar module electrically to another solar module comprises electrically connecting the pre-assembled solar module and the another pre-assembled solar module in series.

19. The method according to claim 12, wherein the surface comprises a rooftop having a pitch of no more than six degrees.

20. The stack according to claim 1, wherein the first profile member and the second profile member each has a length L2, wherein each of the plurality of bifacial solar panels comprises a plurality of solar cells connected in series and disposed within a common encapsulation, wherein each of the plurality of bifacial solar panels has a length L between a first side and a second side, and a height H between a third side and a fourth side, wherein the first side of each of the plurality of bifacial solar panels is connected to the inner side portion of the first horizontal profile member and the second side of each of the plurality of bifacial solar panels is connected to the inner side portion of the second horizontal profile member, and wherein a horizontal distance D between neighboring bifacial solar panels of the plurality of bifacial solar panels is in a range of about 0.8 to about 3 times the height H of the bifacial solar panels.

* * * * *